July 25, 1933.  C. W. BARNEY  1,920,051
POULTRY HOUSE
Filed Sept. 14, 1931  2 Sheets-Sheet 1
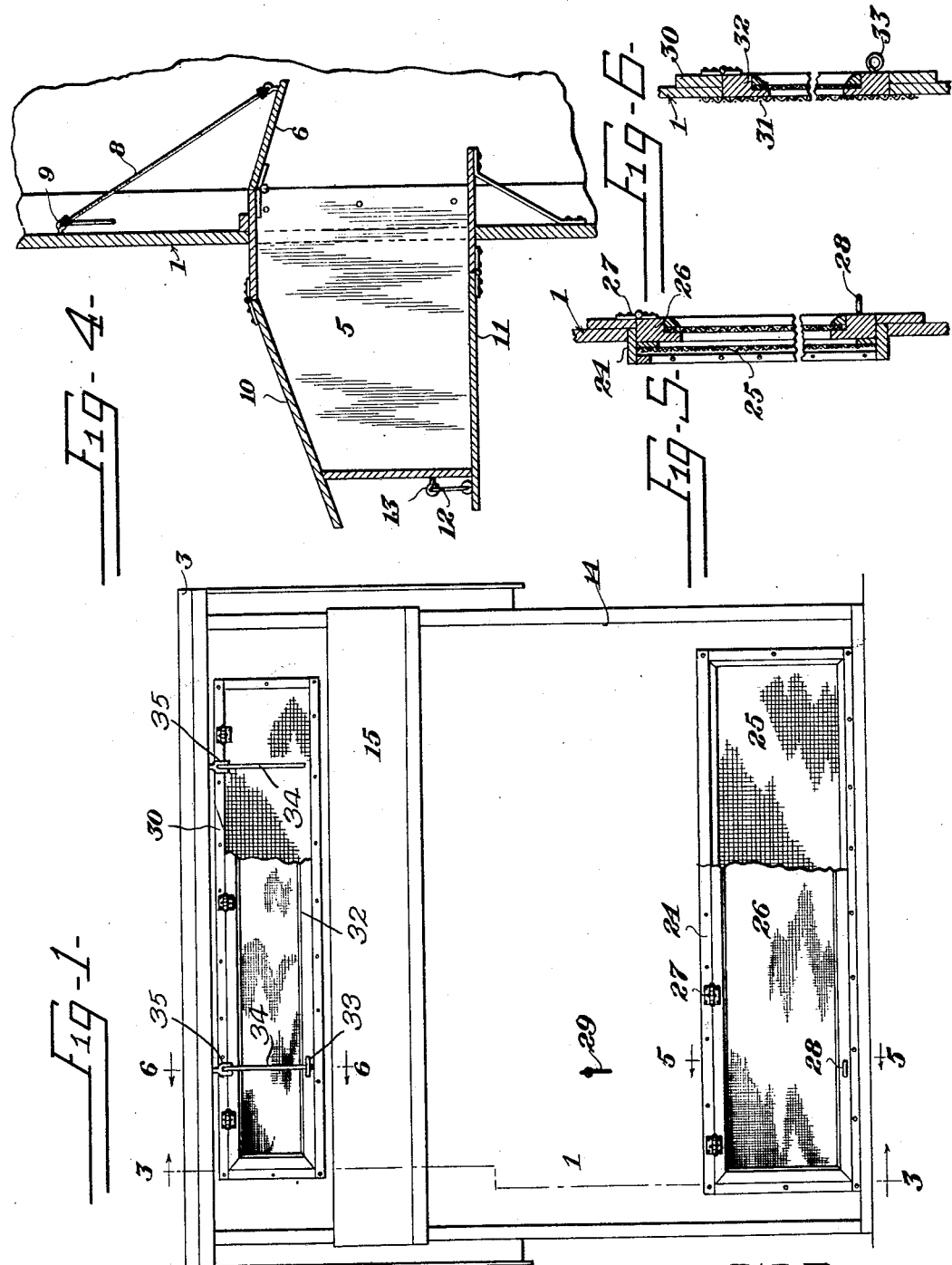
Clayton W. Barney
INVENTOR
BY Victor J. Evans
and Co.  ATTORNEY

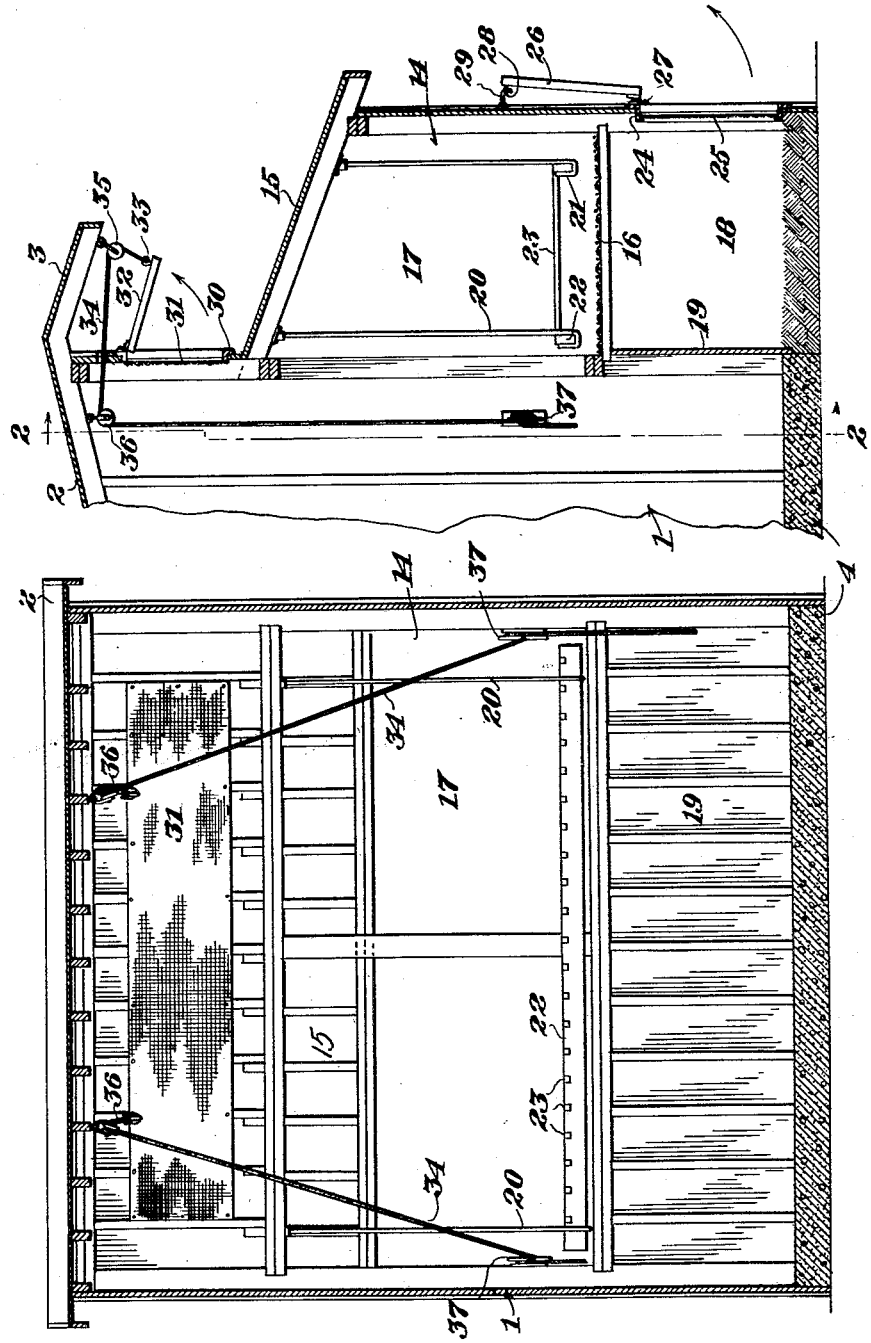

Patented July 25, 1933

1,920,051

UNITED STATES PATENT OFFICE

CLAYTON W. BARNEY, OF CLINTON, WASHINGTON

POULTRY HOUSE

Application filed September 14, 1931. Serial No. 562,790.

My present invention has reference to a new and novel construction of poultry houses, and in carrying out my invention it is my purpose to produce a poultry house which is effectively ventilated in order to prevent the fowls catching cold, developing roup, bronchitis, etc., and whereby such ventilation will retain the litter on the scratching floor in a dry condition and further wherein the droppings from the fowls on the nest are directed to a compartment exterior of the housing, and thereby insuring a clean and sanitary poultry house.

To the attainment of the foregoing the invention consists in the improvement hereafter described and definitely claimed.

In the drawings:

Figure 1 is a front elevation of a henhouse in accordance with this invention.

Figure 2 is a sectional view approximately on the line 2—2 of Figure 3.

Figure 3 is a detail sectional view approximately on the line 3—3 of Figure 1.

Figure 4 is a detail sectional view to illustrate the arrangement of the nests.

Figure 5 is a sectional view approximately on the line 5—5 of Figure 1.

Figure 6 is a sectional view approximately on the line 6—6 of Figure 1.

The poultry house proper may be constructed of any desired material and in the drawings is indicated by the numeral 1. The house 1 has a slanted roof 2 which is inclined from its front to its rear and which projects beyond its sides, its front and its rear in order to effectively shed water from the house. The roof, beyond the front of the house is inclined downwardly, as at 3, to afford a water shed for the front of the house. The house may be erected upon a cement, wood or dirt floor and on this floor there is arranged the scratch litter. Of course the house may be of any desired size to contain any desired number of fowls and the fowls will be effectively exercised in scratching and picking the food from the scratch litter. The house has its sides provided with any desired number of openings closed by glazed glass or curtains so that a proper amount of sunlight is admitted into the house and the house is also provided, preferably at one or both of its sides with an entrance opening that is normally closed by a hinged and latched door.

There may be arranged along the sides and rear of the house nests. Each nest comprises a substantially rectangular body portion 5 that has its inner end received through an opening and secured to the walls provided by such opening. The inner or entrance ends to the nests may be closed by doors 6 which are hinged to the top of the nest bodies and these doors are swung to open positions by flexbile elements 8 that are attached to keepers 9 either on the interior or exterior of the hen house. The top wall of each nest is constructed to form a door opening normally closed by a hinged door 10 which may be opened from the exterior of the housing whereby eggs may be removed from the nest or straw and the like may be properly arranged. Each nest is provided with a partly open bottom that is closed by a door 11 and each door is secured to the front of the nest by a latch 12. The latch is in the nature of a hook that engages with a screw eye 13, and by swinging the hook out of the eye the bottom 11 of the nest may be swung downwardly so that any litter which may have accumulated in the nest may be removed therefrom together with the straw bedding and other bedding arranged in the nest when the bottom 11 is closed and the top door 10 is opened.

Built on the front of the house 1 and forming a part thereof there is an extension 14 that has a downwardly inclined roof 15 which projects beyond the front and beyond the sides of the said extension 3. The extension 14 is divided by a horizontally supported mesh plate 16 into an upper roost compartment 17 and into a lower dropping receiving compartment 18. The roost compartment is open to the poultry house but the compartment 18 is closed therefrom by a suitable wall or partition 19. The wall 19 comprises equidistantly spaced vertical strips which are nailed to the beads that comprise the lower wall or sill that divides the roost compartment 17 from the poultry house proper and to these strips there is nailed or tacked a plate that provides the partition proper.

From the roof joists for the extension 14 there are suspended rod members 20 arranged in spaced pairs that have their lower ends bent to provide substantially U-shaped portions or hooks 21. In the hooks there are received bars 22, each of which being formed with equidistantly spaced notches and in these notches there are arranged the roosting rods 23. The rods 23 are arranged a suitable distance above the wire mesh floor 16, and the floor of the compartment 18 is of dirt.

The outer face of the extension 14, in a line with the compartment 18 is provided with a rectangular opening of a length almost equaling that of the said extension 14 and in this opening there is arranged and fixed a frame 24. Removably fixed in the frame 24, at the portion thereof that is received in the compartment 18, there is a frame or strips for a ventilator 25. The ventilator is in the nature of a wire mesh. Also received in the frame 24 there is a door 26. Hinges 27 connect the door to the top of the frame. The door is paneled, and the panel therefor may and preferably is in the nature of a closely wound curtain or like fabric. The door is provided adjacent to its lower end with screw eyes 28 that are designed to be engaged by hooks 29 suspended from the outer face of the extension 14 when the door is to be swung to open position, as disclosed by Figure 3 of the drawings.

The front of the house 1, above the roof 15 of the extension 14 has a transverse substantially rectangular opening therethrough in which is arranged a frame 30 whose inner face is covered by a ventilator screen 31. The frame 30 also receives therein a door 32 which is hinged to the top of the plate. To the lower end of the door there is secured a pair of spaced screw eyes 33 to each of which there is connected a cord or cable 34 and the said cords or cables are trained over sheave wheels 35 suspended from the joists that support the extension 3 for the roof 2. If desired, and as disclosed by the drawings the cords or cables may be passed through openings in the front of the house 1 and may be trained over other sheave wheels 36 supported from the roof joists in the house and have their ends wound around clips 37 secured on the vertical studs on the inside of the house. By adjusting the cords or cables the door 32 may be arranged at desired inclinations to either cover or partly uncover the ventilating screen 31. Of course, the cords or cables may be operated from the exterior of the henhouse if desired, in which instance the ends thereof are wound around clips on the sides of the extension 14 or on the sides of the house.

With my improvement it will be apparent that the droppings from the fowls will pass through the open mesh 16 and will be directed on through the door of the compartment 18. It will be further apparent that when the doors 26 and 32 are opened that outside air will be circulated entirely through the henhouse, including the nests and the roost compartment. The advantage of the nest construction has heretofore been set forth and it will be apparent that with my improved construction the house is rendered sanitary and is ventilated in a manner that will prevent the fowls from catching cold, and from developing roup, bronchitis or like diseases common to fowls.

While I have herein set forth a satisfactory embodiment of my improved device, my features of invention are capable of extended application and I do not wish to be restricted to the precise structure herein shown and described, and, therefore, hold myself entitled to make such changes therefrom as fairly fall within the scope of what I claim.

Having described the invention, I claim:

1. A poultry house having an extension at the front thereof provided with an inclined roof arranged below the roof of the poultry house, a horizontally disposed open woven plate dividing said extension into an upper roost compartment and into a lower dropping compartment, a roost in the upper compartment, and the floor of the lower compartment being of dirt, a partition dividing the lower compartment from the poultry house, a screened opening in the outer face of the dropping compartment, a hinged door for covering or uncovering the opening, a screened opening in the front of the poultry house above the extension, and a hinged door for covering, uncovering or partly uncovering said opening.

2. A poultry house having its angle roof extending partly over the front thereof and its said front provided with an extension that has a downwardly inclined roof, a horizontal open mesh plate dividing the extension into an upper roost compartment and into a lower dropping compartment, a roost in the upper compartment, a partition dividing the lower compartment from the poultry house, and said lower compartment having its outer face formed with a rectangular opening, a frame in said opening, a ventilating screen in the frame, a door hinged to the top of the frame, and swingable thereinto and likewise swingable against the outer face of the extension, means for latching the door in its last named position, the front of the house, above the extension having a rectangular opening therethrough and a frame in the opening, a ventilating screen in the frame, an upwardly and outwardly opening door hingedly secured in the frame and means for swinging and sustaining the door at desired inclinations with respect to the frame.

3. A poultry house having an extension at the front thereof provided with an inclined roof arranged below the roof of the poultry house, a horizontal open woven plate dividing said extension into an upper roost compartment and into a lower dropping compartment, a partition dividing the lower compartment from the poultry house, a screened opening in the outer face of the dropping compartment, a hinged door for covering or uncovering the opening, a screened opening in the front of the poultry house above the extension, a hinged door for covering, uncovering or partly uncovering said opening, roosts in the roost compartment, comprising spaced pairs of rods suspended from the top thereof and having hooked ends, notched bars received in said hooked ends and rods received in the notches of the bars.

CLAYTON W. BARNEY.